(12) United States Patent
Doerscher (10) Patent No.: US 12,410,826 B1
(45) Date of Patent: Sep. 9, 2025

(54) SECURE QUICK ATTACH/DETACH CLIP (71) Applicant: Terry Doerscher, Austin, TX (US)

(72) Inventor: Terry Doerscher, Round Rock, TX (US)

(73) Assignee: Terry Doerscher, Round Rock, TX (US)

( * ) Notice: Subject to any disclaimer, the term of this patent is extended or adjusted under 35 U.S.C. 154(b) by 0 days.

(21) Appl. No.: 19/211,209

(22) Filed: May 18, 2025

(51) Int. Cl.
  *F16B 2/20* (2006.01)
  *A45F 5/02* (2006.01)

(52) U.S. Cl.
  CPC ............... *F16B 2/20* (2013.01); *A45F 5/021* (2013.01)

(58) Field of Classification Search
  CPC .................................. F16B 2/20; A45F 5/021
  See application file for complete search history.

(56) References Cited

U.S. PATENT DOCUMENTS

| | | | | |
|---|---|---|---|---|
| 1,940,451 | A * | 12/1933 | Frederics | A45D 2/34 132/241 |
| 5,598,608 | A * | 2/1997 | Naslund | B65D 33/1675 24/30.5 R |
| 5,619,775 | A * | 4/1997 | Klinck | A61F 5/4407 24/30.5 R |
| 5,706,560 | A * | 1/1998 | Anscher | A45F 5/02 24/30.5 R |
| D649,029 | S * | 11/2011 | Gallagher, Jr. | D8/383 |
| 9,987,997 | B2 * | 6/2018 | Rarey | B60R 9/048 |
| 2009/0183345 | A1 * | 7/2009 | Rodman | A41D 25/022 24/66.9 |
| 2025/0164034 | A1 * | 5/2025 | Lee | F16L 3/1033 |

* cited by examiner

*Primary Examiner* — David M Upchurch

(57) ABSTRACT

Described are various embodiments of a two-piece clip. The clip being a secure quick attach/detach (SQUAD™) clip described herein. The clip having a front mounted latch mechanism on the SQUAD™ Clip that is readily visible and accessible. The result is greater ease of use and operation of the locking latch, compared to similar attachment devices that utilize a bottom mounted locking mechanism. The SQUAD™ Clip also utilizes side mounting tabs that can be configured and sized to accommodate attachment of a variety of host components. The SQUAD™ Clip is both waist belt and Molle compatible.

14 Claims, 9 Drawing Sheets

FUNCTIONAL SIDE VIEW

FUNCTIONAL FRONT VIEW

CROSS SECTION

PERSPECTIVE VIEW (LEFT SIDE CLIP)

SECURE QUICK ATTACH/DETACH CLIP

STATEMENT REGARDING FEDERALLY FUNDED RESEARCH

None.

FIELD OF INVENTION

This application is directed generally to the field of attachment systems and apparatus, in particular clips.

BACKGROUND

The inherent value of having the ability to quickly install and remove items and equipment from a waist belt, closed loop, or similar attachment point is well established, as evidenced by the popularity and variety of detachable clips that are commercially available. In their simplest form, one-piece clips rely on spring pressure or material flex to hold items in place on the attachment point. Others utilize straps with snaps or buckles. Still others function similar to karabiner clips. These types of clips are generally limited by the size and nature of items they can hold, how those items are physically attached to the clips, and the stability of those items.

More sophisticated, versatile and secure versions of detachable clips utilize a two-piece, hinged design that completely encircles the attachment point, incorporate some form of positive latching mechanism, and have provisions for mounting equipment at multiple points in a stable manner. Available clips of this type have three common attributes: (1) latching mechanisms located on the bottom of the clip; (2) the front and rear halves of the clip are similarly sized, and (3) the front face of the clip constitutes the attachment area.

Clips with latching mechanisms located on the bottom can be difficult to access and manipulate, particularly when larger, rigid items that extend well beyond the periphery of the clip are attached to the face. A bottom release mechanism location also hampers (or completely negates) any visual assistance during manipulation. Since the front of the clip constitutes the extent of available mounting area, and the clip front and rear are similarly sized, the mounting area is inherently limited by the size of the clip itself.

There remains a need for improved compositions for two-piece clips that are easily attached and detached, and offer greater mounting versatility.

SUMMARY

This application describes a solution to the problems described above associated with two-piece clips, the solution being the secure quick attach/detach (SQUAD™) clip with a forward facing accessible latch described herein. The front positioned latch mechanism on the SQUAD™ Clip is readily visible and accessible. In certain configurations the latch is not obscured by a host component and the user does not need to reach around or beneath a host component to release the clip. The result is greater ease of use and operation of the latch compared to similar attachment devices that utilize a latch mechanism positioned on the bottom edge of a clip device. Additionally, the SQUAD™ Clip utilizes a mounting area located to either side(s) of the front of a face plate, which can be sized independently of the rear attachment point, providing a greater range of versatility. This side mount approach also avoids blocking access to the latch mechanism.

In certain embodiments a secure quick attach/detach clip has a face plate having a front face, a back face, a top edge, a bottom edge, and two side edges; and a rear hinge plate having a front face, a back face, a top edge, a bottom edge, and two side edges. The rear hinge plate is coupled to the face plate forming a rotatable hinge at an edge of the face plate and rear hinge plate assembly. The assembly is configured to receive material to which the clip is to be attached when the assembly is open and configured to attach the clip to the material when the assembly is closed. The front face of the face plate has (i) a mounting region configured to be attached to a host component horizontally adjacent to (ii) a latch configured to be offset from an attached host component and accessible from the front or forward face of the face plate.

Certain embodiments are directed to a secure quick attach/detach clip that includes a face plate having a front face, a back face, a top edge, a bottom edge, and two side edges, wherein the face plate has a mounting region/area configured to be attached to an object (e.g., a host component) and a latch region. The face plate is configured to have the mounting region on one side and the latch region on the opposite side. The clip also includes a rear hinge plate coupled to the back face of the face plate forming a rotatable hinge at the top edge of the face plate, the rear hinge plate and the face plate forming a rotatable assembly configured to receive material to which the clip is to be attached when the assembly is open and configured to attach the clip to the material when closed. A latch can be mounted on the latch region positioned on the front face of the face plate with the rear hinge plate positioned on the back face of the face plate forming a rotatable assembly, the rotatable assembly configured to reversibly secure the rotatable assembly in a closed configuration when in use, the rear hinge plate configured to interact with latch to form a closed clip when the latch is engaged with the rear hinge plate. Alternatively, components of the latch can be integral to the face place manufacture. The latch can be but is not limited to a toggle latch or a plunger latch. Clip can be machined, molded, or cast in metal (alloys, aluminum, titanium, nickel, stainless steel, brass, etc.), polymer (e.g., polyamide, polycarbonate, acrylonitrile butadiene styrene, polyoxymethylene, polyetheretherketone, polyphenylene sulfide), reinforced composites (e.g., carbon fiber) or other appropriate material. In particular embodiments the face plate and/or the rear hinge plate are aluminum or an aluminum alloy. In certain aspects the mounting region extends beyond the latch support region forming an extended mounting tab (e.g., forming an L, U, inverted U, H, or T shaped face plate). In certain aspects the face plate can have two mounting regions on either side of the latch region. A mounting region can have multiple mounting holes/slots or provided without predefined mounting holes/slots. In certain aspects the mounting region can have 1, 2, 3, 4, or more mounting holes.

Certain embodiments are directed to a component assembly comprising a clip described herein and one or more host components. In certain aspects the host component can be but is not limited to a holster, magazine pouches, knife sheath, dump pouch, ammo pouch, admin pouch, medical pouch, hydration pouch, tool pouch, radio pouch, phone holder, battery pouch, handcuff case, baton holder, flashlight holster, pepper spray holder, or carrying case.

Other embodiments of the invention are discussed throughout this application. Any embodiment discussed with respect to one aspect of the invention applies to other aspects of the invention as well and vice versa. Each embodiment described herein is understood to be embodiments of the invention that are applicable to all aspects of the invention. It is contemplated that any embodiment discussed herein can be implemented with respect to any method or composition of the invention, and vice versa. Furthermore, compositions and kits of the invention can be used to achieve methods of the invention.

"SQUAD™ Clip" refers to Secure QUick Attach Detach Clip.

The term "latch" refers to devices used to hold two surfaces in proximity—e.g., holding a clip described herein in a closed configuration. A latch provides a mechanism for quick release of the surfaces being constricted. Certain latches rely on physical components like springs, levers, or magnets to secure and release. Draw latches use a hasp, hook, or loop engaged with a clasp to pull two surfaces together, often using a lever or toggle to tighten. Cam latches use a rotating cam (a flat, irregularly shaped piece) that engages or disengages with a keeper to secure or release the latch. Slam Latches use a spring-loaded or beveled bolt that snaps into place when a mating surface is engaged. Plunger latches use a spring-loaded pin or plunger to secure two components together—when engaged, the plunger extends into a corresponding hole or recess, locking the parts in place, it can be retracted by pulling or pressing, allowing for quick release and re-engagement.

As used herein, the term "attachment point" refers to the object to which the clip and host component (equipment) assembly is temporarily affixed, such as a belt, modular lightweight load-carrying straps/webbing loop (MOLLE straps), a mounting bar, or any other material that can pass through the clip attachment opening. MOLLE is an acronym for Modular Lightweight Load-carrying Equipment. MOLLE consists of a grid of nylon webbing, typically in 1-inch strips, stitched in rows with 1-inch gaps between loops, allowing modular pouches to be securely fastened using straps or compatible attachments.

As used herein, the term "host component" refers to any portable equipment, device or gear that is semi-permanently affixed to the clip mounting surface (by a screw of other attachment devices), for purposes of temporarily linking the host component and clip assembly to an attachment point. A variety of host components can be attached using the clip(s) described herein such as, but not limited to, items designed for tactical, outdoor, or everyday carry purposes. Examples of such components includes: (i) Holsters and related weapon accessories such as (a) pistol holsters (Kydex, leather, or polymer holsters for secure firearm carry), (b) magazine pouches (single or double-stack pouches for pistol or rifle magazines), (c) knife sheaths (fixed or folding knife sheaths), (d) dump pouches (e.g., collapsible pouches for spent magazines or quick storage) (e) ammo pouches (e.g., specialized pouches for loose ammunition, shotgun shells, or grenades). (ii) Pouches and Storage such as (a) general purpose pouches (small, medium, or large for miscellaneous gear), (b) admin pouches (e.g., organizers for pens, notepads, maps, or small tools), (c) medical/tourniquet/IFAK pouches (individual first aid kits or trauma supplies), (d) hydration pouches, (e) tool pouches (e.g., for multi-tools, pliers, or other small tools), or "fanny packs". (iii) Communication and Electronics devices such as (a) radio pouches, (b) phone holders, (c) battery pouches, (d) remote microphone holders. (iv) Other tactical and specialty attachments (e.g., handcuff case, baton holder, flashlight holster, pepper spray holder). (v) Small hard-sided carrying cases (e.g., laptops, satellite links, recon drones).

The use of the word "a" or "an" when used in conjunction with the term "comprising" in the claims and/or the specification may mean "one," but it is also consistent with the meaning of "one or more," "at least one," and "one or more than one."

Throughout this application, the term "about" is used to indicate that a value includes the standard deviation of error for the device or method being employed to determine the value.

The use of the term "or" in the claims is used to mean "and/or" unless explicitly indicated to refer to alternatives only or the alternatives are mutually exclusive, although the disclosure supports a definition that refers to only alternatives and "and/or."

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

As used herein, the transitional phrases "consists of" and "consisting of" exclude any element, step, or component not specified. For example, "consists of" or "consisting of" used in a claim would limit the claim to the components, materials or steps specifically recited in the claim. When the phrase "consists of" or "consisting of" appears in a clause of the body of a claim, rather than immediately following the preamble, the phrase "consists of" or "consisting of" limits only the elements (or components or steps) set forth in that clause; other elements (or components) are not excluded from the claim as a whole.

As used herein, the transitional phrases "consists essentially of" and "consisting essentially of" are used to define steps, features, components, or elements, in addition to those literally disclosed, provided that these additional materials, steps, features, components, or elements do not materially affect the basic and novel characteristic(s) of the claimed invention. The term "consisting essentially of" occupies a middle ground between "comprising" and "consisting of".

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

DESCRIPTION OF THE DRAWINGS

The following drawings form part of the present specification and are included to further demonstrate certain aspects of the present invention. The invention may be better understood by reference to one or more of these drawings in combination with the detailed description of the specification embodiments presented herein.

DESCRIPTION

The following discussion is directed to various embodiments of the invention. The term "invention" is not intended to refer to any particular embodiment or otherwise limit the scope of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be an example of that embodiment and not intended to imply that the scope of the disclosure, including the claims, is limited to that embodiment.

Figure 1:
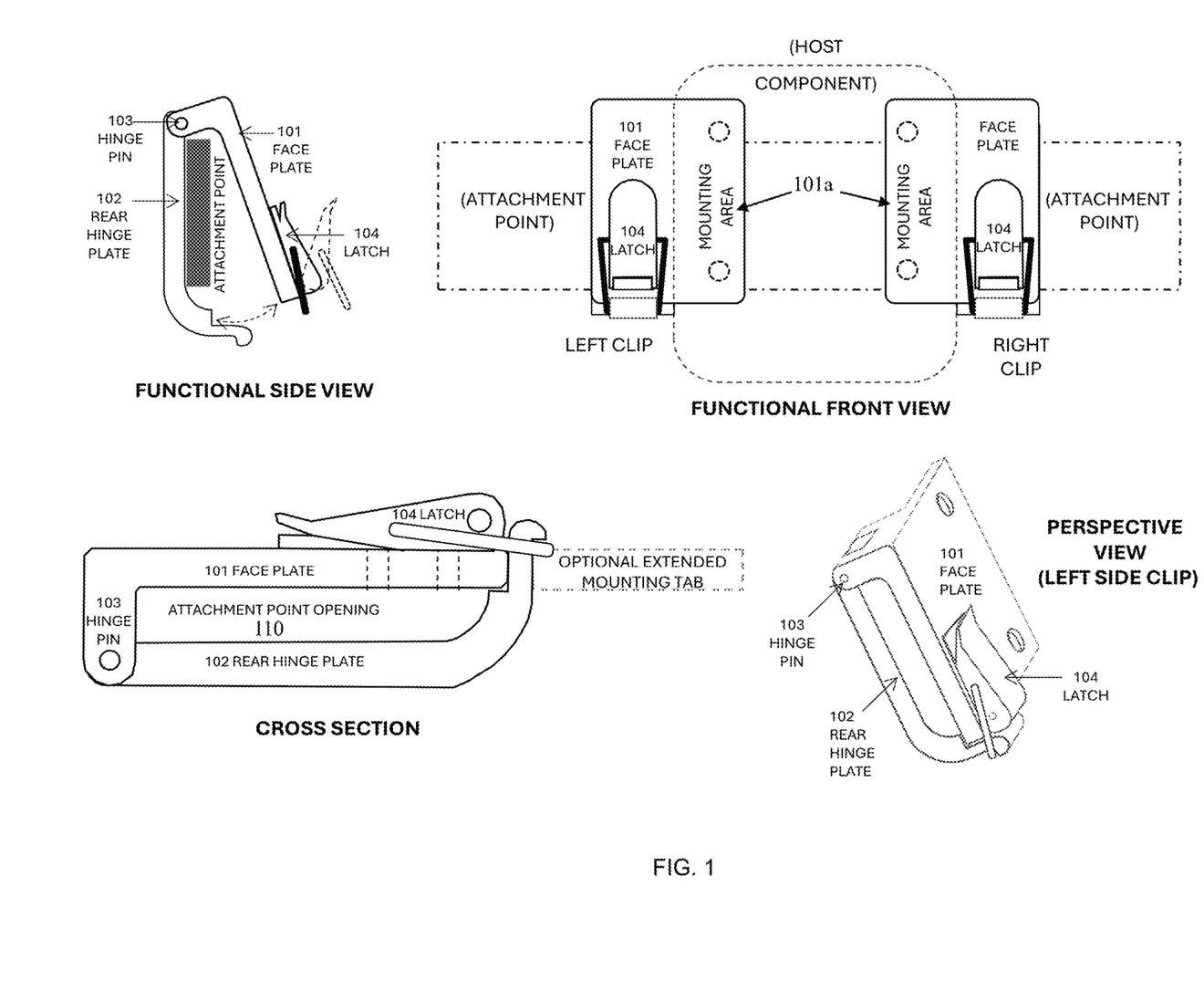
FIG. 1. Illustration of one example of a SQUAD Clip General Design.

FIG. 1 illustrates one embodiment of a Secure Quick Attach/Detach (SQUAD™) clip device and components (also referred to generally as "clip"). The clip comprises four main components: face plate 101 comprising one or more mounting tab/areas 101a, rear hinge plate 102, latch 104, and hinge pin 103 as described herein. Face plate 101 is connected to the rear hinge plate 102 by a hinge secured by hinge pin 103. In certain aspects the latch 104 (or 105) maintains the face plate 101 and rear hinge plate 102 in a closed position. Face plate 101 has at least one mounting tab region 101a configured for attaching a host component to the clip. In certain aspects a clip may have two or more mounting tab regions. The clip when closed forms a lumen, a channel, or an attachment point opening 110 which receives or encircles the attachment point securing the clip and an associated article to the attachment point.

Figure 2:
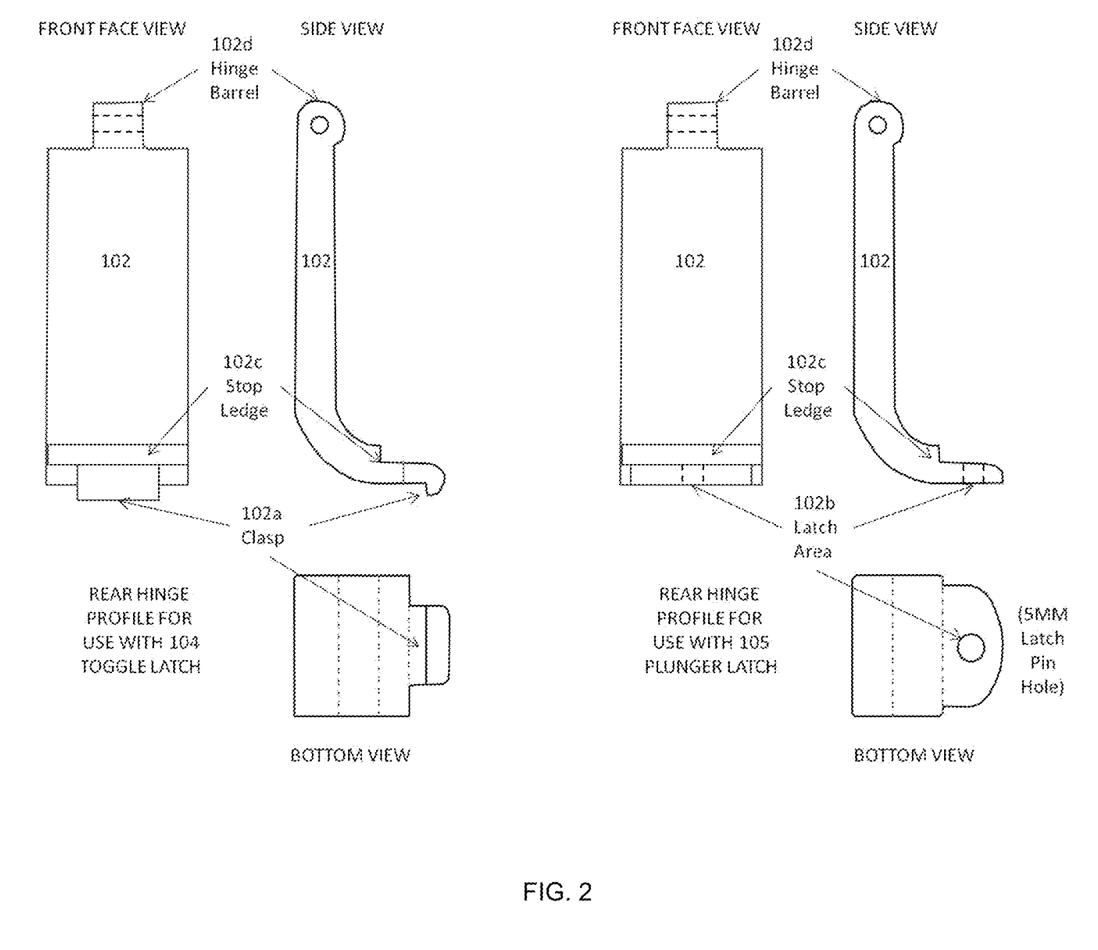
FIG. 2. Illustration of one example of the Rear Hinge Plate.

FIG. 2 illustrates one example of a front and side view of rear hinge plate 102. Rear hinge plate 102 is configured with a clasp 102a (or locking hole 102b) to interact with the latch 104 (or 105) on the face plate. The inside face of the rear hinge plate can incorporate a stop ledge 102c that is configured for the face place edge to rest once the clip is latched. In certain configurations the latch projects from the flat surface of the rear hinge plate to form a roughly J-shape in cross section. Combined with the depth of the hinge extension on the Face Plate, stop ledge 102c acts as a closure stop, establishing a fixed width of the attachment point opening (e.g., nominally 0.25-0.27 inches to accommodate a 0.25 inch thick belt or strap). These dimensions are as examples only. The attachment point opening can be any appropriate dimension from width of 0.1, 0.25, 0.5, 0.75, 1.0 inch or foot; length of 0.1, 0.25, 0.5, 0.75, 1.0 inch or foot; and depth of 0.1, 0.25, 0.5, 0.75, 1.0 inch or foot, including all values and ranges there between.

When attaching a host component the rear hinge plate 102 is inserted behind the attachment point (e.g., belt, strap, or loop) followed by bringing face plate 101 in proximity and latching the clip enclosing the attachment point. Acting similar to a shoehorn, a curved J shape of the bottom of the rear hinge plate 102 facilitates smooth insertion and removal from a belt, or a PALS/MOLLE loop. Rear hinge plate 102 has one or more hinge barrels 102d on the end opposite the clasp. The hinge barrel can have a center hinge pin hole and interlocks with one or more hinge extension knuckles of face plate 101.

In one example the width of the Rear Hinge Plate can be 0.65 to 0.75 inches, with a nominal thickness of 0.180-0.200 inches. This size facilitates insertion into a standard PALS/MOLLE 38 mm wide (approximately 1.5 inch) loop opening, yet provides adequate stability for belt use. The overall length of rear hinge plate 102 varies depending on the intended application. In one example the standard SQUAD™ Clip, intended for use with waist belt up to 1.5 inches wide, has a rear hinge plate approximately 2.25 inches long, resulting in an attachment point opening of 1.6 inches. A larger heavy-duty model (SQUAD™ HD), is designed for use with law enforcement duty belts, riggers belts, or tactical "battle belts" with the rear hinge plate of approximately 3 inches long to accommodate belts up to 2.25 inches wide.

Figure 3:
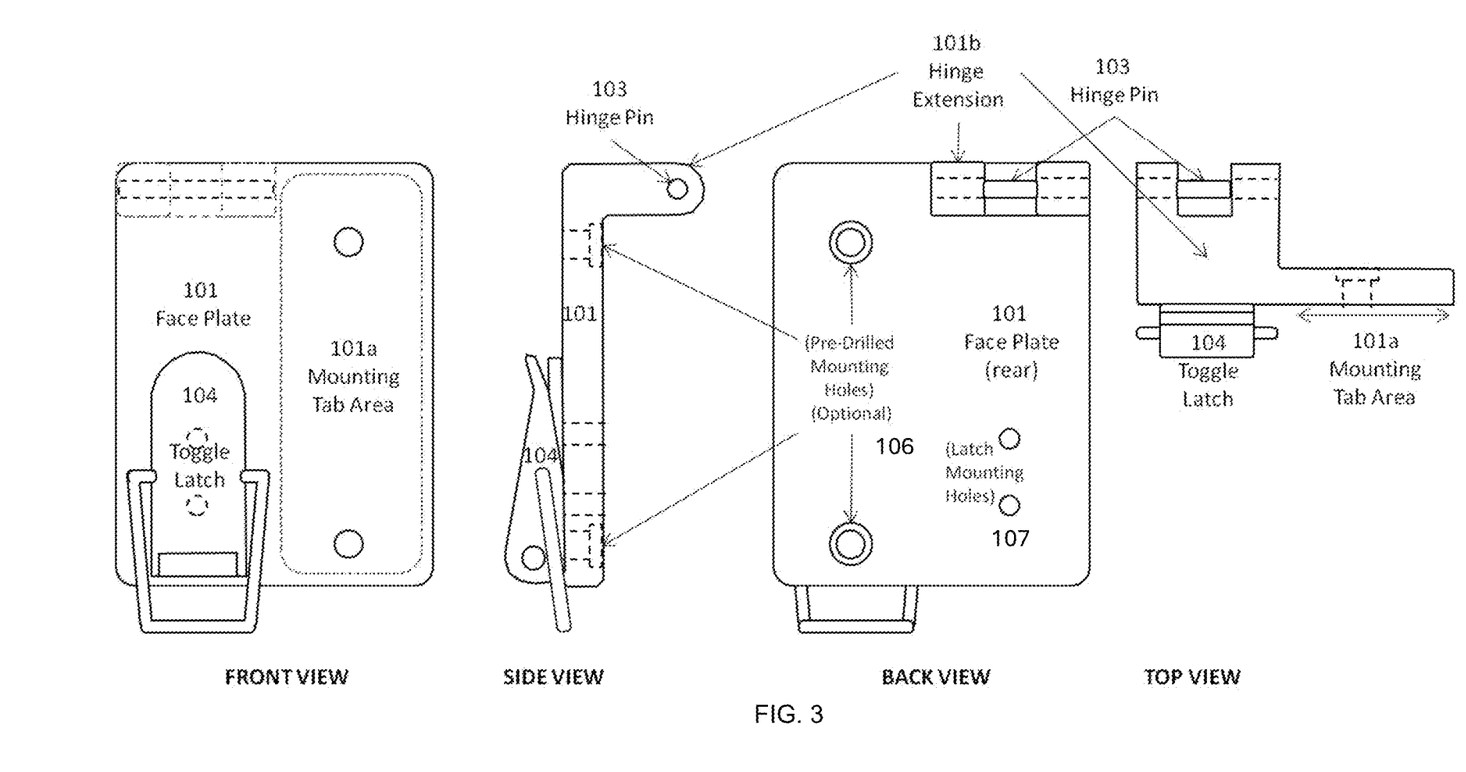
FIG. 3. Illustration of one example Face Plate and Latch mechanism.
Figure 4:
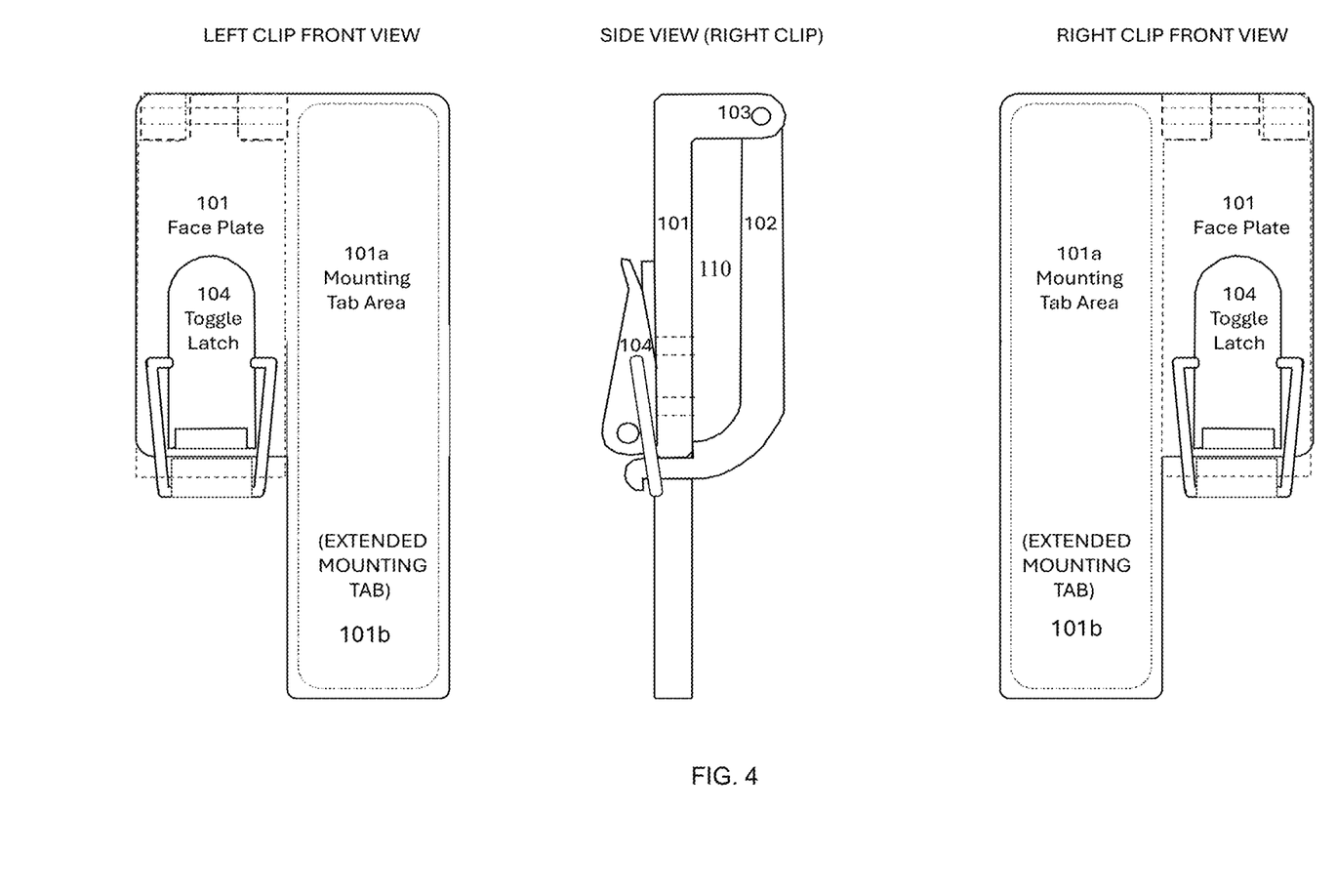
FIG. 4. Illustration of one example of SQUAD Clips with extended mounting tabs.

FIG. 3 illustrates a front, side, back and top view of face plate 101. The mounting tab 101a can, but need not extend beyond the latch portion of face plate 101 providing a larger mounting surface. FIG. 4 illustrates a front view of a left clip and a right clip face plate, and a cross section of the face plate having an optional mounting extension. In certain aspects face plate 101 is of one-piece construction. Face plate 101 has a hinge extension 101b that projects from plane of the face plate projection forms an L shape cross section. The hinge extension is located at the top, perpendicular to the front of the plate. The end of the hinge extension forms the inner and outer barrels of the hinge on one end and is configured to interlock with the hinge barrel of the rear hinge plate. The hinge extension also forms as the primary load bearing surface that transfers the weight of the host component or accessory to the attachment point.

The exterior of face plate 101, relative to the positioning when the clip is engaged, 101, provides a surface for locating a latch mechanism, directly in front of the hinge extension, as well as an adjacent mounting area for attaching the host component or accessory. A mounting tab area(s) 101a is/are adjacent to the latch location area of the face plate configured for attaching/attachment of a host component. Mounting tab 101a can be oriented on the left side, right side, or both sides of the face plate depending on model (see also FIG. 1, FIG. 4 and FIG. 7).

Figure 7:
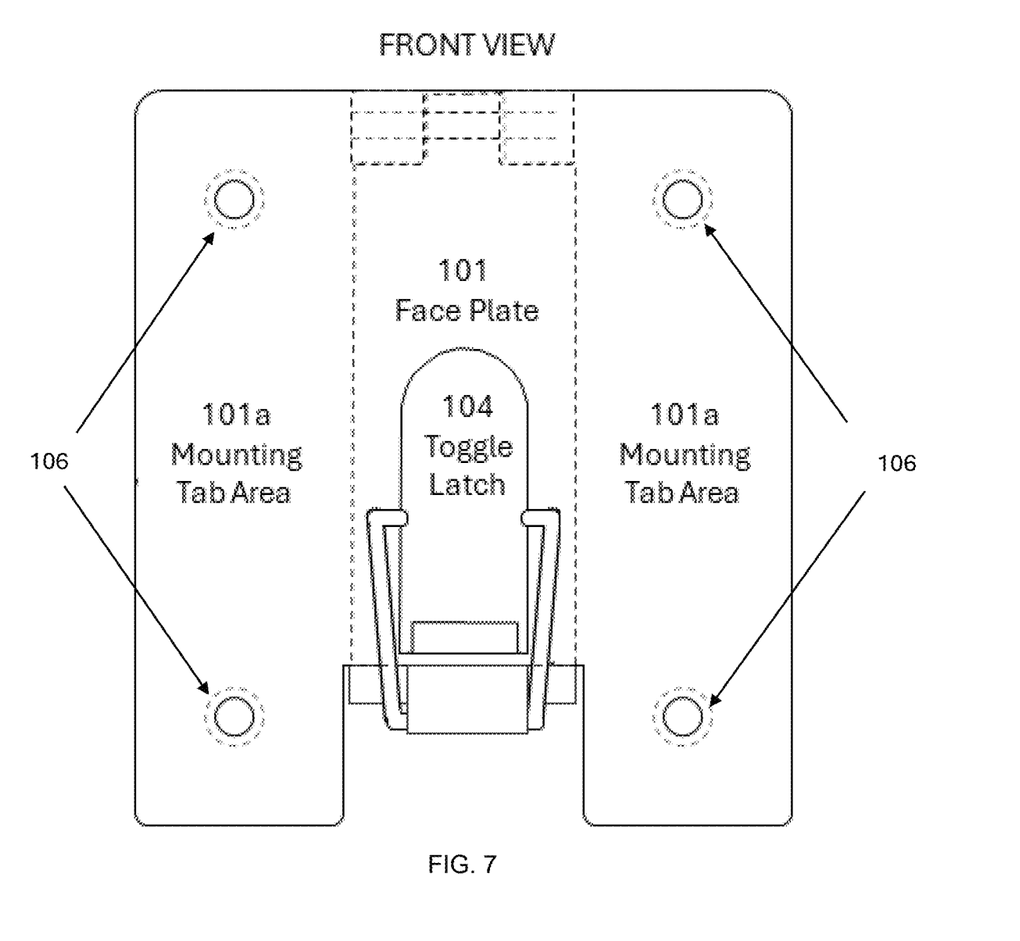
FIG. 7. Illustration of one example of a SQUAD Clip with Dual Mount Face Plate

In certain aspects the nominal thickness of face plate is 0.180-0.250 inches, this thickness can be altered depending on circumstances of use. The length and width of the mounting tab area varies depending on model. A standard model SQUAD™ Clip has a mounting tab height corresponding with the overall height of the face plate at the hinge and latch area (approximately 2.25 inches), and a width of 0.75 inch that extends to one side (as depicted in FIG. 1, and FIG. 3). This results in a total standard model SQUAD™ Clip size of approximately 1.5 inches wide, and 2.25 inches high. FIG. 4 illustrates an extended mounting tab model incorporating, for example, a 3 inch long mounting tab. An extra large (SQUAD™ XL) model provides a 1.25 inch wide by 3 inch long mounting tab. FIG. 7 illustrates a dual mount model of the SQUAD™ clip that provides a mounting tab area to either side of a central latch location, allowing two host components (e.g., pistol magazine holder and flashlight pouch) to be attached using a single clip. Face plate 101 can be manufactured with or without pre-drilled mounting holes in the mounting tabs. Because the mounting tab area is to the side of the clip latching function, the shape and size of the mounting tabs of all models can be modified by the end user if needed.

Hinge pin 103 (reference FIG. 1 and FIG. 4.) interfaces with the hinge barrels of the rear hinge plate (102*d*) and face plate hinge extension (101*b*) which are centrally drilled to accommodate the hinge pin. The hinge pin joins the two plates together and enables rotation about the hinge. The hinge pin can be stainless steel material (or other appropriate alternative), nominally 2.5 mm in diameter and 0.75 inches long.

Latch mechanism ('Latch') 104 (or 105) is affixed to the front of the face plate 101 offset from the mounting tab area 101*a*. The Latch securely maintains the clip in the closed position when engaged. When disengaged, it enables the clip to hinge open. The moveable part (e.g., hasp/loop/pin) of the latch engages with the clasp extension or other receiving structure on the rear hinge plate to hold the clip firmly closed. Referencing FIG. 5 and FIG. 6, the latch mechanism may be different in design detail, depending on model, price point, and end use. Regardless of specific design and construction details, any latch utilized has the same function, purpose, and common attributes such as one or more of the following general attributes: (i) front mounted on the face plate for ease of manipulation and visualization, (ii) provides for one handed operation, (iii) hold the rear hinge plate and face plate securely together when latched, (iv) size footprint compatible with the available latch mounting area, (v) a low profile that is not prone to snagging or inadvertent opening, (vi) compatible with the rear hinge plate general design, (vii) durable, strong, and made from corrosion and chemical resistant materials, and/or (viii) easily adapted to the overall design, use, and operation of the SQUAD™ Clip.

Prototype SQUAD™ Clips have achieved very good results using a small, low cost, commercially available, spring loaded stainless steel toggle latch 104 (as depicted in FIG. 1, FIG. 3, FIG. 4 and FIG. 5). The latch base 104*a* can be attached to the Face Plate with, for example, two threaded stainless steel fasteners located under the toggle 104*b*. It is small and low profile (approximately 0.25 inches thick, 0.75 inches wide, and 1.50 inches long), easily operated, firmly and positively snaps closed, and has proven to be strong and durable. In certain embodiments the latch can be spring loaded towards the closed direction, in the unlikely event that the toggle is inadvertently opened due to a momentary snag, the spring maintains the latch loop in contact with the clasp on the Rear Hinge Plate, preventing the clip itself from opening.

Figure 6A:
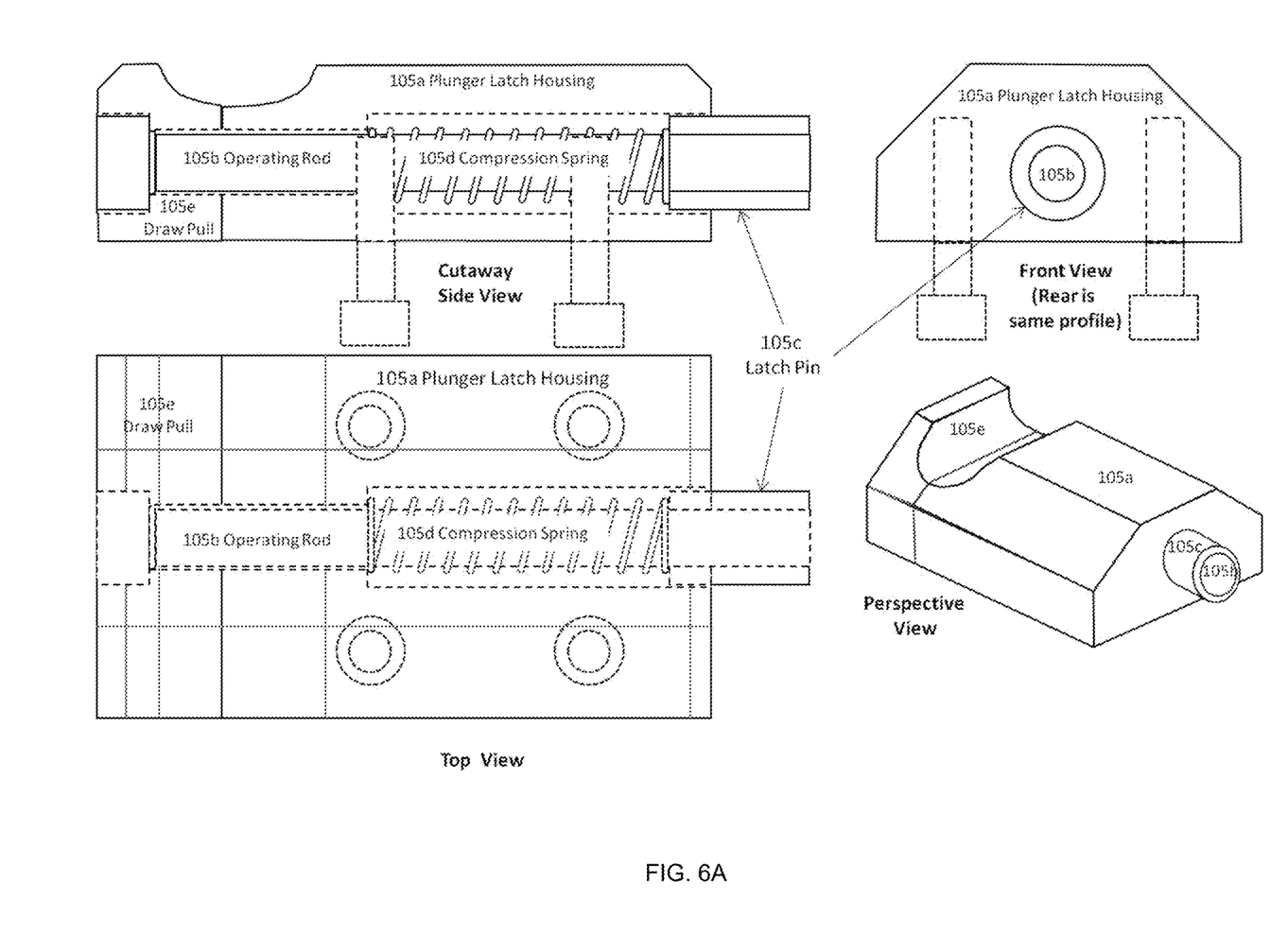
FIG. 6A-6C. Illustration of one example Spring Plunger Latch. (A) Illustration of a side cross-section view, top view, front view, and perspective view of plunger latch. (B) Illustration of SQUAD clip incorporating a plunger latch. (C) Illustration of an exploded view of a plunger latch.
Figure 6B:
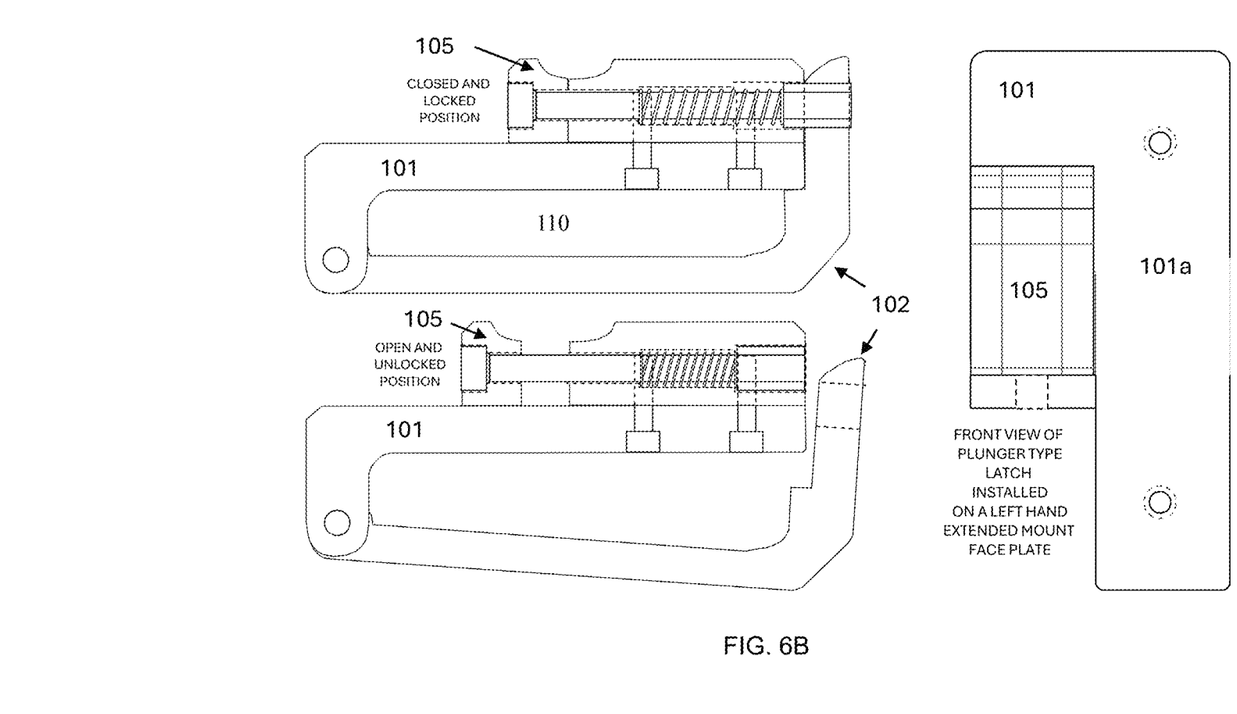
Figure 6C:
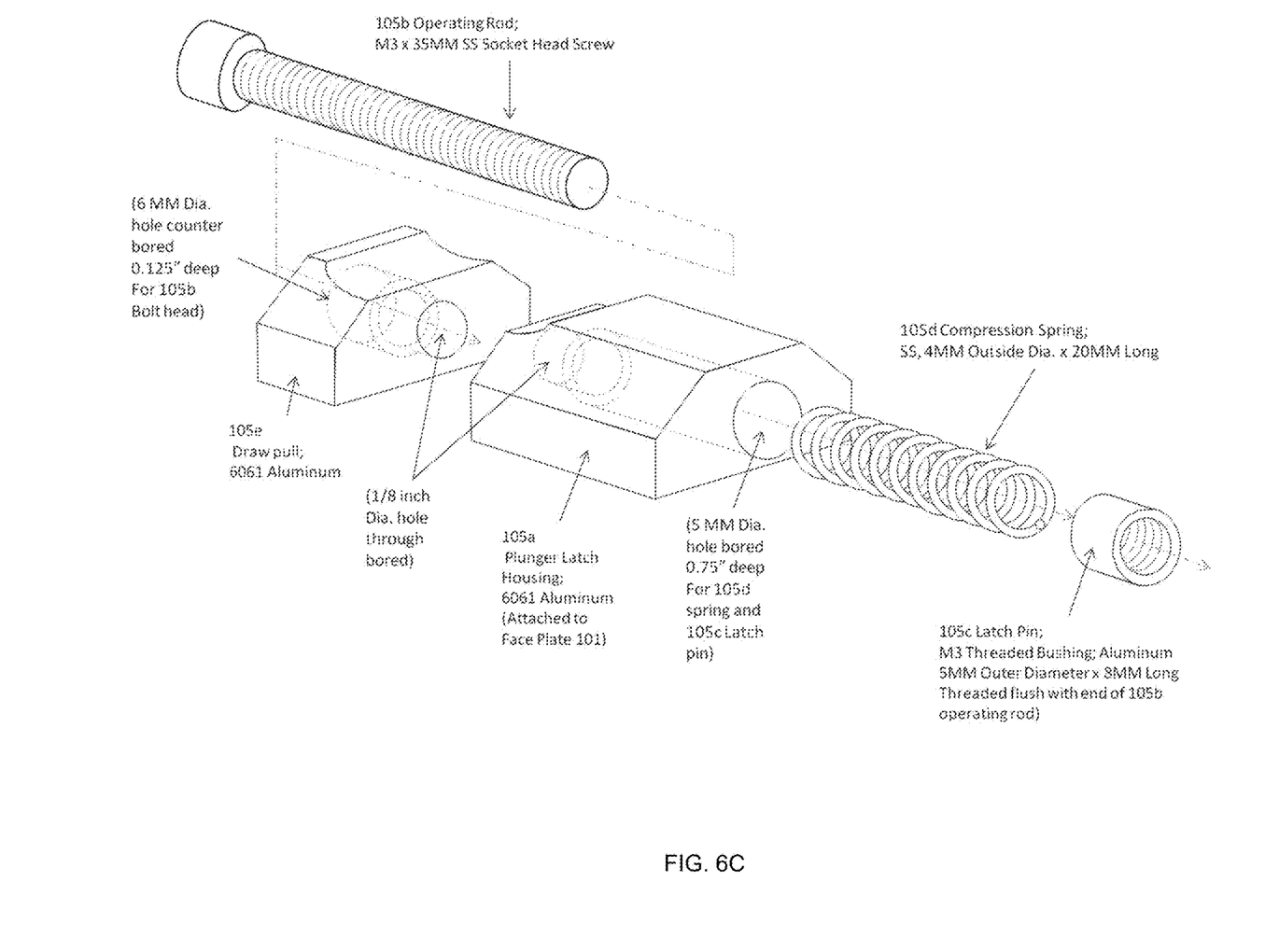

In certain aspects a heavy-duty latch option is utilized to address extreme, or mission critical applications such as military use. A heavy-duty, enclosed latch provides improved durability, and is less susceptible to impact damage, or clogging from adverse environmental conditions (snow, ice and mud). To facilitate this use case, other prototype clips have also successfully employed a spring loaded plunger type latch 105 (Ref. FIG. 6). This latch utilizes a spring loaded 5 mm diameter latch pin 105*c* that engages in a corresponding hole in the rear hinge plate latch area 102*b*. The profile of the rear hinge plate latch area (see FIG. 2) is modified as appropriate to correspond to this type of latch when utilized, as the latch clasp 102*a* is no longer needed. The plunger latch housing 105*a* is attached to the face plate 102 in a similar location and fashion as the toggle latch 104. The plunger latch is operated by retracting the operating rod 105*b* upward approximately 0.25 inches against compression spring 105*d* pressure via the draw pull 105*e*, sufficient to release the latch pin from the locking hole in the rear hinge plate latch area. The spring plunger latch is nominally 0.75 inches in width, 1.25 inches long and 0.4 inches thick.

Depending on the base material used to make commercial SQUAD™ Clip components, other latch options may be utilized. For example, a polymer version of the clip presents the opportunity to also utilize a polymer latch designed to take advantage of more flexible material properties, compared to metal versions.

Materials. For example, the rear hinge plate and face plate can be machined from aluminum castings or extrusions, and assembled with aluminum or stainless steel latches, stainless steel pins and fasteners. This has proven to be highly functional, dimensionally stable, strong, and durable. All metal construction is preferred for full size firearm holsters, military use and heavy-duty applications. Injection molded or 3D printed polymer can also be used to manufacture clips as described herein. This option is appealing for its lower cost. A polymer version of the SQUAD™ Clip is contemplated. Polymer clips would not require coating. Metal versions of the SQUAD™ Clip can be offered uncoated for models intended to be end user modified, or for applications where there are no aesthetic/tactical considerations. Other metal versions would receive some form of durable coating, such as powder coating; epoxy based or heat cured paint; or a phosphate-based finish.

Host Component Mounting. All other detachable clips of this type utilize predefined mounting holes or slots on their face. Unfortunately, there is no single widely adopted industry mounting configuration standard. As a result, incompatible size and positioning between the holes in a mounting clip and the host component is common. This mismatch is exacerbated when the hole positions are such that the strength or rigidity of the clip face (or the host component) could be compromised by elongating/drilling additional holes in order to achieve correct alignment. To address this, SQUAD™ clips offer the option for mounting tabs without predefined mounting holes. This gives the end user the option to mark and drill mounting holes that are precisely aligned with pre-existing holes or openings in the host component.

In addition to limiting accessibility to the locking mechanism mounted on the bottom, mounting the face of a detachable clip to equipment adds thickness to the overall package. In addition to the thickness of the clip face itself, there are other additive considerations, including fastener head thickness, and/or any associated molded indentations on the inside of the host mounting surface to accommodate the fastener.

This has particular implications for firearm holsters when concealment is an important consideration. A detachable clip face attached to the center back area of a holster increases its overall thickness, which pushes the holster further away from the body. This creates greater potential for "printing" (a bulge or shape discernible under clothing).

By utilizing side mounting tabs attached at the holster edge seams located along the vertical centerline of the holster, the SQUAD™ clip does not increase the overall thickness of the package, and maintains the firearm tight against the body.

In preparation for use, each SQUAD™ Clip is first mounted to the host component. Although primarily intended to be used in pairs, a single clip may be utilized for small components. When used in pairs, the left and right clips are oriented as desired at the outer periphery of the host component. The host component is positioned to maintain adequate distance from the latch mechanism to avoid impeding its access and function. If the clips are to be used in conjunction with PALS/MOLLE loops, installation on the host component should take into consideration the incremental spacing of the loops. If desired, modifications to the width and length of the mounting tab area, as well as adding holes or slots, can be undertaken by the end user. Although any number of methods can be used, the most typical approach to mounting the clips to the host component would involve use of threaded fasteners. Two fasteners per clip are recommended, to ensure stability and provide redundancy.

Depending on the model, the end user either employs pre-drilled holes in the mounting tabs (sized and countersunk to accommodate a Chicago-type fastener), or locates and drills mounting holes or slots as needed. Thread locking compound, washers, backing plates, or spacers may be utilized as needed. Once the clip(s) are mounted, the component is ready for use.

To use, the SQUAD™ clip is unlatched and hinged open. The Rear Hinge Plate is inserted behind the attachment point (belt or strap, or into a PALS/MOLLE loop). The Face Plate of the clip is then closed to mate with the Rear Hinge Plate, and the Latch is engaged. The order is reversed for removal; disconnect the latch, open the clip slightly, and pull the host component up and out until it is free from the attachment point.

Figure 5:
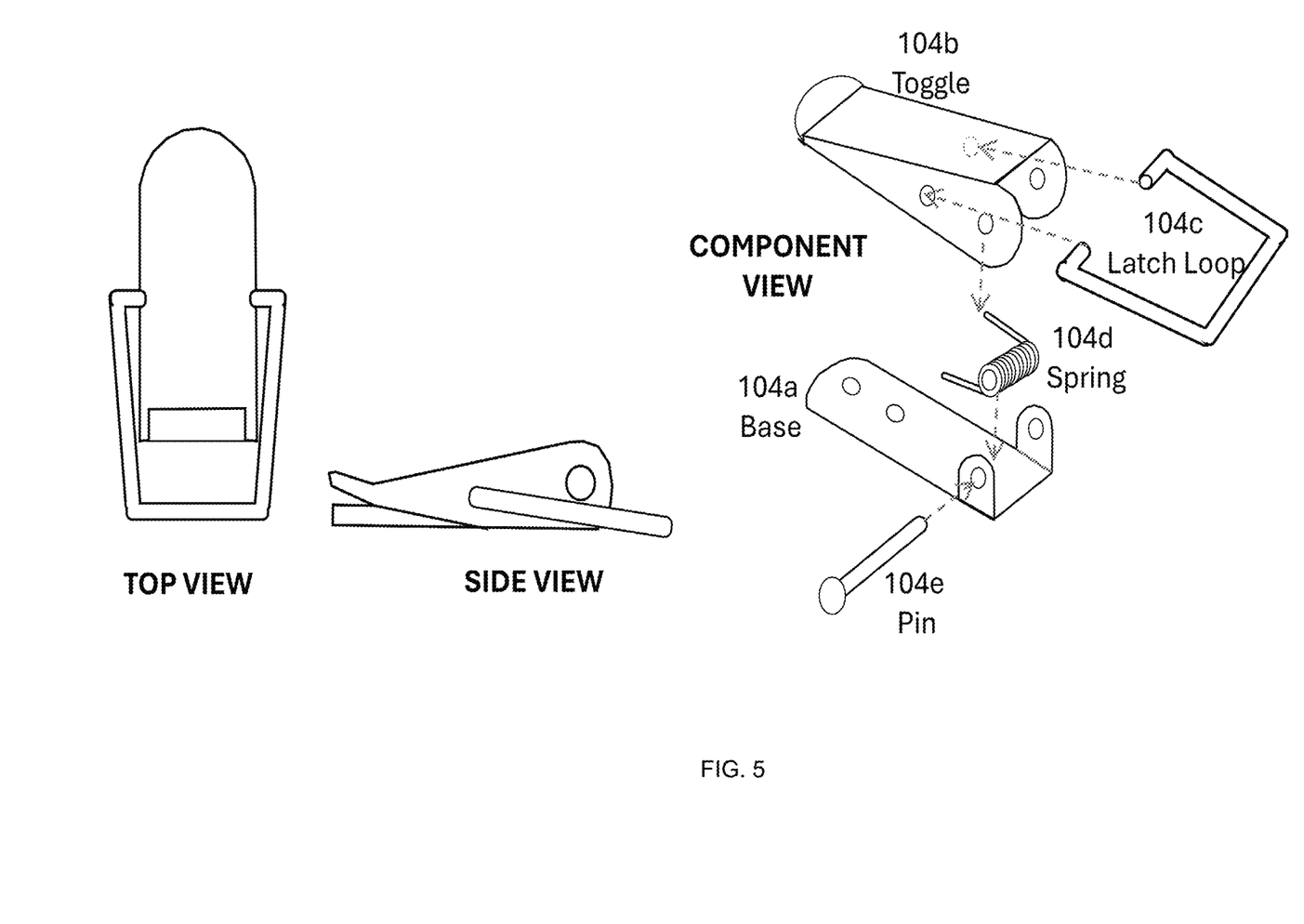
FIG. 5. Illustration of one example Toggle Latch

Only two fingers are necessary to operate the toggle latch mechanism 104. The thumb opens the toggle (against spring pressure) approximately 90 degrees. While in this position, the index finger is used to manipulate the latch loop outward to clear the clasp, while rotating the face plate and host component assembly outward. Once the toggle is released, it returns to the closed position via spring pressure, which also holds the disengaged latch loop free of the clasp.

The spring plunger latch 105 is operated by retracting the draw pull upward with a finger to disengage the latch pin from the hole in the rear hinge latch area, while rotating the face plate and host component assembly outward. Once the draw pull is released, the latch pin returns to the closed position via spring pressure.

The invention claimed is:

1. A secure quick attach/detach clip comprising:
   a face plate having a front face, a back face, a top edge, a bottom edge, and two side edges; and a rear hinge plate having a front face, a back face, a top edge, a bottom edge, and two side edges,
   wherein the rear hinge plate is coupled to the face plate forming a rotatable hinge at an edge of the face plate and rear hinge plate assembly, the assembly configured to receive material to which the clip is to be attached when the assembly is open and configured to attach the clip to the material when the assembly is closed;
   the front face of the face plate having (i) a mounting region configured to be attached to a host component horizontally adjacent to (ii) a latch configured to be offset from an attached host component and accessible from the front face of the face plate.

2. The secure quick attach/detach clip of claim 1, wherein the latch is attached to the front face of the face plate.

3. The secure quick attach/detach clip of claim 1, wherein the latch is integrated into the front face of the face plate.

4. The secure quick attach/detach clip of claim 1, wherein the latch is a toggle latch or a plunger latch.

5. The secure quick attach/detach clip of claim 1, wherein the hinge is positioned at the top edge of the assembly.

6. The secure quick attach/detach clip of claim 1, wherein the assembly is configured to be compatible with a waist belt and/or Molle strap.

7. The secure quick attach/detach clip of claim 1, wherein the face plate, the rear hinge plate, or the face plate and the rear hinge plate are metal or polymer.

8. The secure quick attach/detach clip of claim 7, wherein the face plate and/or rear hinge plate are stainless steel, aluminum, titanium, or an alloy.

9. The secure quick attach/detach clip of claim 7, wherein the face plate and/or rear hinge plate are nylon, or carbon fiber.

10. The secure quick attach/detach clip of claim 1, wherein the mounting region extends from the face plate forming a mounting extension.

11. The secure quick attach/detach clip of claim 1, wherein the face plate has two mounting regions on either side of the latch.

12. The secure quick attach/detach clip of claim 1, wherein the mounting region has one or more mounting holes.

13. A component assembly comprising a clip of claim 1 coupled to one or more host components.

14. The component assembly of claim 13, wherein the host component is one or more of a holster, a magazine pouch, a knife sheath, a dump pouch, an ammo pouch, an admin pouch, a medical pouch, a hydration pouch, a tool pouch, a radio pouch, a phone holder, a battery pouch, a handcuff case, a baton holder, a flashlight holster, a pepper spray holder, or a carrying case.

* * * * *